Sept. 8, 1925.  
J. B. HENDERSON  
SIGHTING DEVICE  
Original Filed July 26, 1919    4 Sheets-Sheet 1

1,553,078

Inventor  
James B. Henderson  
By his Attorney  
Henry Moakley.

Sept. 8, 1925.
J. B. HENDERSON
1,553,078
SIGHTING DEVICE
Original Filed July 26, 1919      4 Sheets-Sheet 3
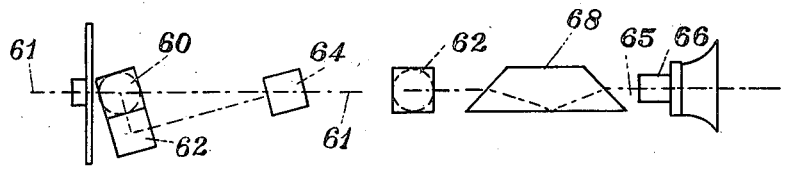
Fig. 4a        Fig. 5a
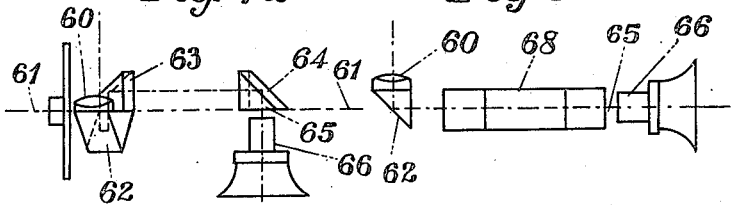
Fig. 4b        Fig. 5b
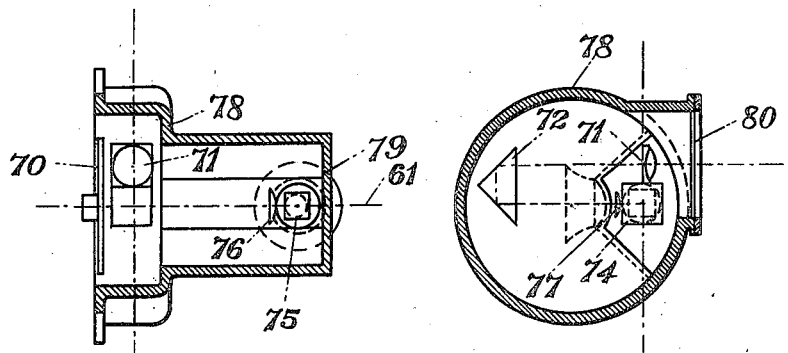
Fig. 6a        Fig. 6c
Fig. 6b
Inventor
James B. Henderson
By his Attorney
Henry Moatley Sept. 8, 1925.

J. B. HENDERSON

SIGHTING DEVICE

Original Filed July 26, 1919  4 Sheets-Sheet 4

1,553,078

Inventor
James B. Henderson
By his Attorney
Henry Mockley

Patented Sept. 8, 1925.

1,553,078

UNITED STATES PATENT OFFICE.

JAMES BLACKLOCK HENDERSON, OF LEE, ENGLAND.

SIGHTING DEVICE.

Original application filed July 26, 1919, Serial No. 313,542. Divided and this application filed May 19, 1920. Serial No. 382,677.

(GRANTED UNDER THE PROVISIONS OF THE ACT OF MARCH 3, 1921, 41 STAT. L., 1313.)

*To all whom it may concern:*

Be it known that I, JAMES BLACKLOCK HENDERSON, a subject of the King of Great Britain, residing at 2 Cambridge Road, Lee, in the county of Kent, England, have invented certain new and useful further Improvements in Sighting Devices (for which I have filed an application in England No. 16,669, on November 25th, 1915), of which the following is a specification.

The object of my invention is to improve sighting devices such as gun-sights, bomb-droppers, range-finders, position-finders, artificial horizons or in general any optical sighting device for use on board ship or on an air-ship or aeroplane or on any other moving platform, by eliminating the effects of the angular motion of the ship, aeroplane or platform, so that the image of the target or other object viewed through the telescope, may be stationary in the focal plane of the telescope irrespective of this angular motion. In the following description the external object sighted will be called the target and the moving platform will be called the ship.

In former patents I have described several methods of carrying out my object. The present invention relates to (1) improvements in the telescope itself whereby the optical definition is improved and remains equally good throughout the roll of the ship so long as the image of the target is visible in the telescope, (2) improvements by means of which the image of the target is visible throughout a greater angle of roll, (3) improved means for compensating for the effects of straying of the gyroscope or inertia bar on the image of the target in the telescope, (4) improvements in periscopic sights, periscopes or dial sights whereby the image of the target remains stationary on the cross wires irrespective of the rolling of the ship.

This application is a divisional of my application for sighting devices, Serial No. 313,542. Filed July 26, 1919.

Figure 3:
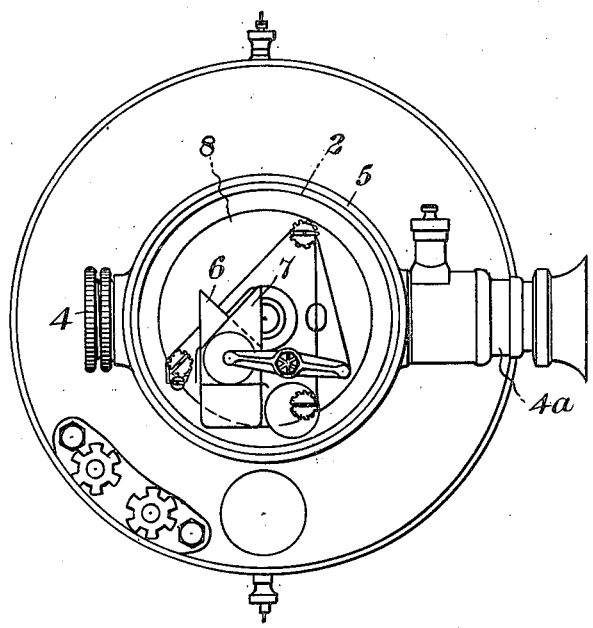
Fig. 3, is an end view of Fig. 1 with part of the casing removed to more clearly show the optical parts.
Figure 3A:
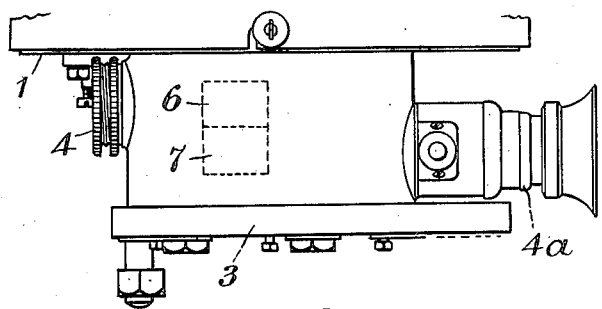

Fig. 3$^a$, is a plan of the telescope portion of the sight.

Figs. 4$^a$ and 4$^b$, show an alternative optical arrangement in which the objective and focal plane are both on the axes.

Figs. 5$^a$ and 5$^b$, show an alternative optical arrangement in which the whole optical system is stabilized except the eye piece.

Figure 7A:
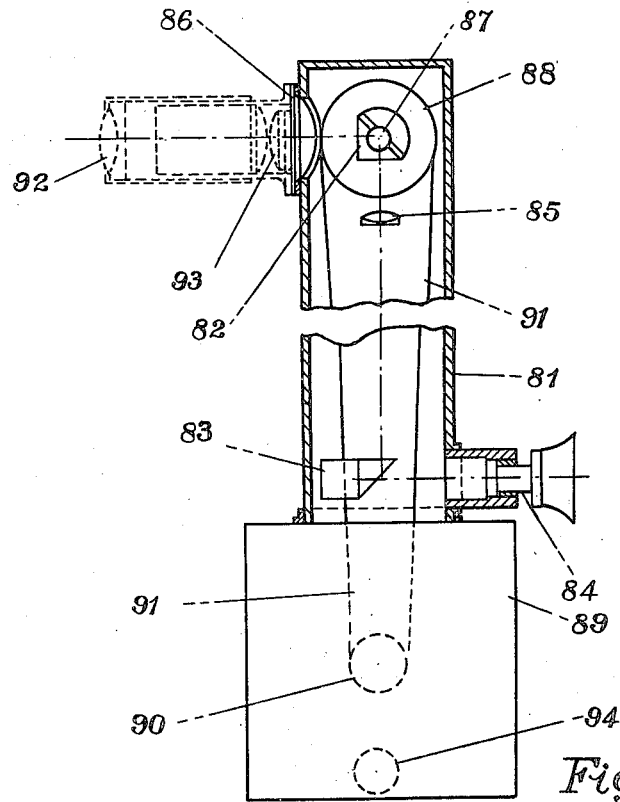
Figure 7B:
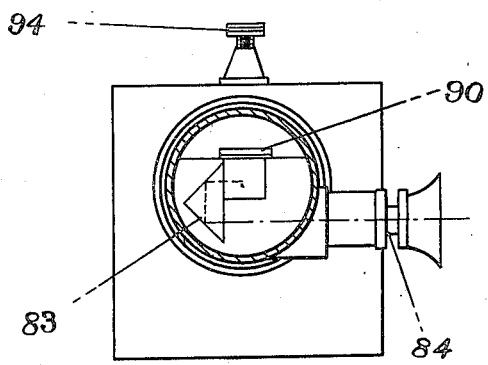

Figs. 6$^a$, 6$^b$, 6$^c$, show an alternative optical arrangement in which the whole optical system is stabilized including the eyepiece and in which the eye piece is in or near the trunnion axis, and Figs. 7$^a$, 7$^b$, show an alternative optical arrangement which is specially suitable for use with periscope sights.

The main frame of the telescope consists of a disc 1, carrying a circular tubular projection 2 which serves as the case of the telescope and also as the support of the instrument because this tube screws on to the bracket 3 which is mounted on the sight pedestal. The telescope consists of the objective 4 and the eyepiece 4$^a$ (Fig. 3) carried by the ring 5 which fits on the outside of the tube 2 but is capable of being turned relatively to this tube, oval slots being cut in the tube to pass the telescope beam. The prisms 6 and 7 of the telescope are rigidly attached to the prism plate 8 which is pivoted on the frame 1 on the ball bearing 9. Compound with the prism plate but on the opposite side of the disc 1, is the cylinder 10. The prism plate and cylinder are stabilized by a gyroscope in its casing 11 (Fig. 1) which fits into a ring 11$^a$ supported on a horizontal trunnion axis 12 on the gimbal ring 13 so that the gyro rotor axis is approximately vertical. The gimbal ring is supported at one end by the trunnion 14 which slides into the prism plate axially and at the other end by a trunnion 15 which slides axially in a bearing 16, supported from the disc 1 by the U bracket 17. The gyro 11 and its supporting ring 11$^a$, have small gravitational stability on the trunnions 12 due to the weight 31$^a$ and the trunnion axis 12 is below the level of the trunnion axis 14—15 so as to give increased stability about the latter axis.

The prism plate 8 has an angular adjustment relatively to the trunnion 14 of the gimbal ring. This may be brought about in several different ways but in Fig. 1 it is brought about by a roller 18 carried by a short pillar 19 attached to the gimbal ring 13. This roller engages in a helical slot in the cylinder 10 so that when the gimbal ring is slid bodily in the direction of the axis of the trunnions 14—15, the prism plate turns about the axis of these trunnions. This translation of the gimbal ring as a whole is brought about by the screw 20 which rocks the lever 21 about its fulcrum on pillar 22 and moves the upper end of the lever to the right or left according as the screw 20 is screwed in or out. The upper end of the lever 21 bears against a ball centre attached to the gimbal ring, concentric with the trunnion 14, and the similar lever 23 presses against a similar ball centre concentric with the trunnion 15. The spring 25 acting through the lever 23 and its fulcrum on the pillar 24 serves to keep the gimbal ring always pressed against the lever 21 and the lever 21 pressed against the screw 20.

Figure 1:
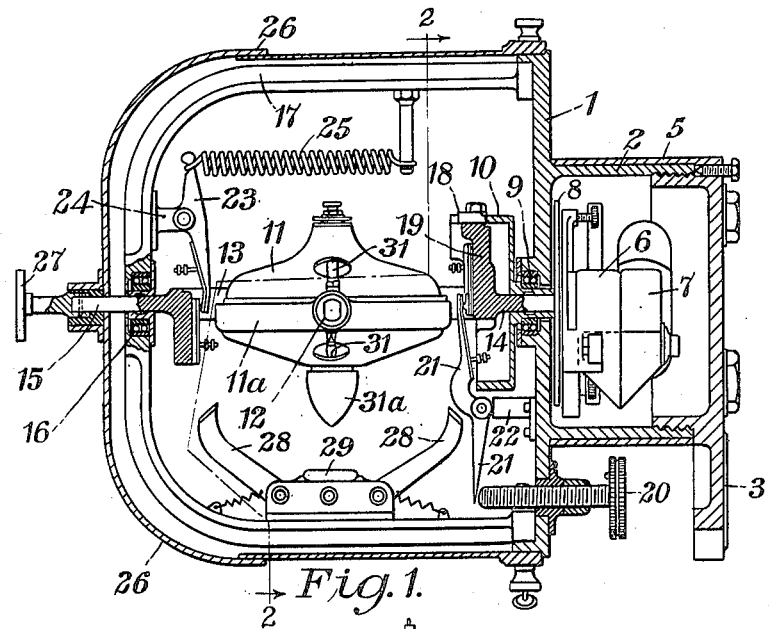
Fig. 1, is a central elevation through one form of sight constructed in accordance with my invention.
Figure 2:
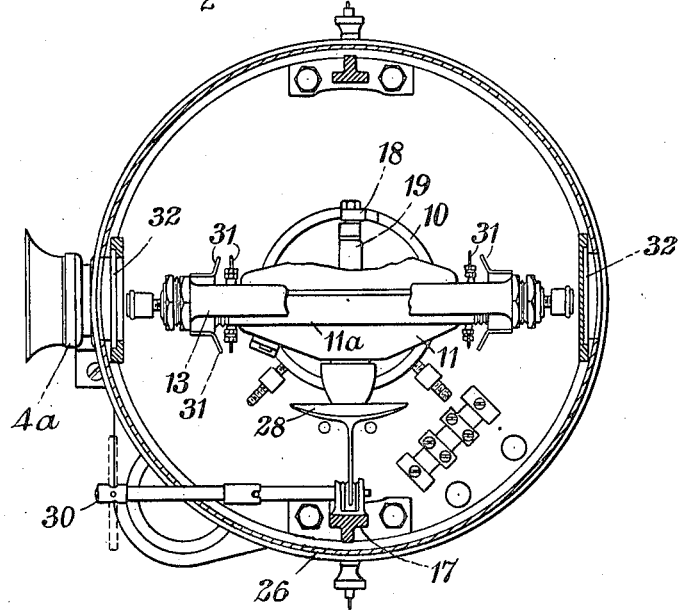
Fig. 2, is a section of Fig. 1 approximately upon the line 2—2.

The gyro 11 can be caused to precess about the trunnion axis 12 by means of the handle 27 (Fig. 1) which fits on the end of the trunnion 15, outside the cover 26. It can also be caused to precess about the trunnion axis 14—15, by means of one or the other of the two levers 28 which can be turned by the cam 29 and the handle 30 (Fig. 2) projecting through the cover 26. Each lever 28 is fitted with a T head as shown in Fig. 2 and when the T head touches the weight 31$^a$ attached to the gyro case 11 the gyro precesses round the trunnions 14—15, and carries the prism plate 8 with it. This precession is only used as a very rough adjustment, the screw 20 providing the fine adjustment. The gyro rotor axis is kept approximately perpendicular to the gimbal ring 13 by means of the handle 27, the relative position of the gyro case and gimbal ring being indicated by the pointers and scales 31 (Fig. 1) which are visible through the windows 32 in the outer cover 26.

The electric current may be led in to the gyro by flexible insulated connections at each trunnion or by insulated spring plug connections incorporated in the trunnions, but which since they form no part of this invention are not shown in the drawing.

The optical advantages of the above arrangement of telescope are (1) the objective and eyepiece are normally on the same level and the parallax error due to any angular motion of the disc 1 round the trunnion 14 is less than it would be if the objective and eyepiece were not normally on the same level, (2) with the prisms stabilized so that the telescope beam always enters and leaves the prisms perpendicular to the surface of the glass the chromatic aberration produced by the prisms is constant and can be compensated by a suitable want of achromatism in the objective, (3) the objective and focal plane are brought as close as possible to the axis of the instrument commensurate with a given focal length and a given length of instrument parallel to the trunnion axis. By elongating the cylindrical case of the telescope the diameter of the case may be reduced so the objective and focal plane may be brought closer to the axis and by re-arranging the parts both cross wires and objective might be placed on the axis and both incorporated in the stabilized system.

Thus in Figs. 4$^a$ and 4$^b$ the objective 60 has its optical centre on the trunnion axis 61. The prisms 62 and 63 are compound with the objective and reflect the beam to the right and slightly upwards into the singly reflecting prism 64 on the face 65 of which the focal plane is arranged, the centre of the cross wires being on the axis 61. The eyepiece 66 completes the telescope. All parts are stabilized by the gyro except the eyepiece 66.

An alternative arrangement is shown in Figs. 5$^a$ and 5$^b$ in which the observer looks along the axis. The prism 68 is introduced to invert the image. The objective 60, the prisms 62 and 68 and the cross wires 65 would all be stabilized in this case.

Another alternative arrangement I may adopt is to stabilize the whole telescope system and arrange the parts so that the eye point of the telescope falls on the trunnion axis. The rubber eye guard is attached to the outer case and moves with the ship but the whole of the optical parts of the telescope including the eye lens are attached to the prism plate. In Figs. 6$^a$, 6$^b$ and 6$^c$ the prism plate 70 carries the objective 71, the doubly reflecting prism 72, the two single-reflecting prisms 74 and 75, the field lens 76, and eye lens 77. The outer case 78 carries the rubber eye guard 79 and the window 80. The eye point of the telescope is arranged to fall on the axis 61.

In periscopic sights and others in which there is difficulty in arranging stabilized prisms between the objective and eyepiece I may arrange the stabilized prisms to be outside the telescope in front of the objective.

In Figs. 7$^a$ and 7$^b$, 81 is an ordinary periscope with a single reflector 82 at the upper end and a treble reflector 83 at the lower end next to the eye piece 84, the tube being fitted with an objective 85 and window 86. The reflector 82 is mounted on trunnion 87 to which a small pulley 88 is fixed for the purpose of turning the prism 82 with respect to the tube of the periscope. The gyro and its fittings arranged as in Fig. 1 are contained in the box 89 but have not been shown in Figs. 7ª and 7ᵇ for the sake of simplicity. In this case a pulley 90 is substituted for the prism plate of Fig. 1. The pulley 90 is one-half the diameter of pulley 88 and is connected to the latter by means of the band or belt 91. As the ship rolls the pulley 90 does not roll with it since it is stabilized by the gyroscope. Due to the band 91 connecting this pulley to pulley 88, the latter will be turned relatively to the gyroscope through an angle equal to one-half the angle through which the ship rolls, thereby maintaining the image of the object fixed in the field of view.

Alternatively I may stabilize the prism 82 so that it rolls through the same angle as does the ship by making the two pulleys 88 and 90 of the same diameter, and then fit in front of the aperture 86 an erecting telescope having magnification 2. This is shown dotted in the figure as a Galilean telescope consisting of an objective 92 and a negative lens 93. In either arrangement the correction for straying of the gyro is effected by means of the screw 94, which corresponds to the screw 20 in Fig. 1.

The arrangement of the several parts may take many different forms but all must have the common feature that the stabilized prism or prism combination must be inverting and, if placed outside the telescope, must move through one-half the angle of roll of the ship, or if a telescope having a magnification of two is placed in front of the stabilized prism, the latter must be moved through an angle equal to that through which the ship rolls.

I claim:

1. An optical instrument for use on an angularly moving body comprising optical elements adapted to partake of the angular movement of the body, an optical element mounted to move relatively to the body, a stabilizing device free from forced oscillations in phase with the disturbing forces introduced by the oscillations of the body and connections between the device and the optical element for communicating to the element one-half of the relative movement between the device and the body.

2. An optical instrument for use on an angularly moving body comprising optical elements adapted to partake of the angular movement of the body, an optical element mounted to move relatively to the body, a gyroscope and connections between the gyroscope and the optical element for communicating to the element one-half of the relative movement between the gyroscope and the body.

3. An optical instrument for use on an angularly moving body comprising optical elements adapted to partake of the angular movement of the body, a member having a reflecting surface in optical relation to said elements, a stabilizing device free from forced oscillations in phase with the disturbing forces introduced by the oscillations of the body and connections between the member and the device for communicating to the member one-half of the relative movement between the device and the body to compensate for the effects of the angular movement of the body on the field of view of the instrument.

4. An optical instrument for use on an angularly moving body comprising optical elements adapted to partake of the angular movement of the body, a member having a reflecting surface in optical relation to said elements, a gyroscope and connections between the member and the gyroscope for communicating to the member one-half of the relative movement between the gyroscope and the body to compensate for the effect of the angular movement of the body on the field of view of the instrument.

5. An optical system adapted for use on an angularly movable platform, comprising an optical element adapted to move with the platform, a reflector movable relatively to the platform, a gyroscope comprising a rotor and a case mounted upon a trunnion axis and means connecting said axis to said reflector and consisting of elements having a two to one ratio of relative movement whereby the reflector moves through an angle equal to one half of the angle through which the platform moves.

6. An optical instrument for use on an angularly moving body comprising an observation instrument adapted to partake of the angular movement of the body, an external reflecting device in optical relation to the observation instrument, gyroscopic stabilizing means for the device and connections between the stabilizing means and the device for communicating to the device one-half of the relative movement between the stabilizing means and the body.

7. An optical instrument for use on an angularly moving body comprising an observation instrument adapted to partake of the angular movement of the body, an external reflecting device in optical relation to the observation instrument, gyroscopic stabilizing means for the device, connections between the stabilizing means and the device for communicating to the device one-half of the relative movement between the stabilizing means of the body and means for producing relative angular adjustment between the stabilizing means and the device.

8. An optical instrument for use on an angularly moving body comprising a casing carrying some of the optical parts of the instrument, a member rotatably mounted on the casing and carrying another optical part, a gyroscope, a support within which the gyroscope is mounted upon two trunnion axes, means for moving the gyroscope and the support parallel to one of the axes, a part connected to the member and a part connected to the support forming an operating connection between the member and the support for communicating to the member one-half of the relative movement between the gyroscope and the body and means associated with said connection for changing the angular relation between the member and the support upon movement of the gyroscope and the support parallel to one of the axes.

9. An optical instrument for use on an angularly moving body comprising a frame, optical elements mounted on the frame and adapted to partake of the movement of the body, an optical element mounted to move relatively to the body, a gimbal ring slidably mounted in the frame, a gyroscope for stabilizing the gimbal ring, means for shifting the gimbal ring automatically in one direction, a regulatory control for the gimbal ring operable in the reverse direction, connections between the gimbal ring and movable optical element for communicating to the element one-half of the relative movement between the gyroscope and the body and means for adjusting the connections by a sliding movement of the gimbal ring in the frame to change the relation between the gimbal ring and the movable optical element.

10. An optical instrument for use on an angularly moving body comprising a frame, a telescope provided with a movable reflecting device, a gyroscope, a gimbal ring for the gyroscope stabilized thereby and having trunnions slidably mounted in the frame, the frame being adapted to turn about the trunnions, means having a cam and follower relation with the gimbal ring and controllingly combined with the reflecting device for communicating to the device one-half of the relative movement between the gyroscope and the body and means to slide the gimbal ring to alter the cam and follower relation between the gimbal ring and the reflecting device.

11. An optical instrument for use on an angularly moving body comprising a frame, a telescope provided with a movable reflecting device, a gimbal ring provided with trunnions for slidably mounting the ring with respect to the frame, a gyroscope pivotally mounted in the gimbal ring for stabilizing the ring, connections between the device and the gimbal ring for communicating to the device one-half of the relative movement between the gyroscope and the body, said connections including a cam and a follower, one being associated with the device and the other with the gimbal ring, means to change the relation of the cam and follower to adjust the device relatively to the telescope, means for precessing the gyroscope about the axis of the gimbal ring trunnions and means for precessing it about the axis of its own pivotal support.

JAMES BLACKLOCK HENDERSON.